Nov. 5, 1968

L. W. WEAVER 3,408,718

METHOD OF MANUFACTURING CARTRIDGE CASES AND
ARTICLE OF MANUFACTURE

Filed June 16, 1966

INVENTOR.

Lazelle W. Weaver

BY Hill, Sherman, Meroni, Gross & Simpson

ATTORNEYS

INVENTOR.
Lazelle W. Weaver

United States Patent Office 3,408,718
Patented Nov. 5, 1968

3,408,718
METHOD OF MANUFACTURING CARTRIDGE CASES AND ARTICLE OF MANUFACTURE
Lazelle William Weaver, Mentor, Ohio, assignor to TRW Inc., Cleveland, Ohio, a corporation of Ohio
Filed June 16, 1966, Ser. No. 557,948
9 Claims. (Cl. 29—1.3)

ABSTRACT OF THE DISCLOSURE

A method of manufacturing brass, drawn, articles, such as for example, cartridge cases, of superior finished physical characteristics wherein a plurality of successive forming operations are undertaken each of which provides a limited reduction in wall thickness and outside part diameter. The method permits elimination of substantially all intermediate annealing stages conventionally employed in prior art systems and is preferably performed in a manner causing successive forming steps to occur without intermediate cooling.

---

As those skilled in the art of munitions manufacture are aware, brass cartridge cases have been employed for small arms ammunition for almost a century. However, since the advent of modern gunpowders and the introduction of extremely strong alloy steels, gun cartridge chamber gas pressures have increased greatly. In view of the tremendous gas pressures now employed in modern armament, it is imperative that the cartridge cases employed be capable of withstanding such pressures without cracking along their longitudinal wall surfaces or at any portion of the rear or head portion of the case. Much research has been expended in an effort to construct brass cartridge cases having sufficiently high strength, hardness and integrity of grain structure to eliminate failures, even under high pressure conditions.

As a result of experimentation, and the manufacture of many millions of rounds brass cartridge cases, extremely elaborate manufacturing processes have been developed. These prior art processes have recognized that the strength level in cartridge brass is primarily dependent upon the amount of cold work imparted to the material during its deformation in processing. It was found that the most effective manner of forming the material comprised a series of deep drawing operations, normally performed on a series of presses, which imparted a high degree of cold working to the case blank. Excessive cold working of the cartridge brass material was in the past found to be disadvantageous due to a build-up of residual stresses which can cause the ultimate cartridge case to crack or split under conditions of long storage, or during actual service. Accordingly, the amount of cold-working of the brass material has been regulated in prior manufacturing processes by providing annealing treatments between successive deep drawing operations. As a matter of experience, United States Government arsenals and the specifications issued to contractors manufacturing cases for the United States Government, have consistently employed a large number of annealing steps in the manufacture of the case from an initial generally circular blank of sheet brass stock.

In spite of these annealing steps used in the manufacture of prior art cartridge cases the resulting case has not been consistently satisfactory and, further, the many annealing steps make necessary continual and multiple cleanings, picklings and inspections. Such arsenals as the Frankford Arsenal have manufactured small arms ammunition by such prior art processes. There, as an example, the cartridge case was drawn from an initial cupped blank to a final cartridge casing by way of at least six drawing operations with four or five intermediate anneal steps. While such annealing steps provide in themselves, problems in the manufacture of the cases, the steps, to be effective, are ordinarily coupled with related washing, drying and pickling operations following the anneal. After the washing and pickling operations, it has been conventional practice in the prior art to provide careful inspection of the case between each of the drawing steps to discard cases already showing cracks or other fatigue failures. Accordingly, the process of manufacturing cartridge cases in accordance with the prior systems has required very elaborate equipment, large amounts of factory space, and a large number of employees. In accordance with the principles of the present invention, I have eliminated such intermediate steps and have still controlled the amount of material flow in the dies to assure a cold-working and lengthening of the case without overstressing the case material and without requiring the intermediate anneals heretofore considered essential. In addition to eliminating the anneals, my improved process also eliminates the pickling intermediate steps and the inspections heretofore undertaken during the intermediate processing. As a result of the improved method of manufacturing cartridge cases, the factory floor space and apparatus required to manufacture such cases has been reduced to an absolute minimum and storage facilities for handling cases during the intermediate step of annealing and pickling have been completely eliminated.

In accordance with my improved process, a multiple stage press is employed. This press provides a sequence of drawing steps and a communication system between stages to provide for extremely rapid transfer of the drawn case blank from one stage to the next so that the heat necessarily developed from each drawing stage is retained in the case throughout its processing. By providing an accurate control of the amount of reduction in the area of the wall, and in the length of the case in each drawing stage, I have found that the case may be constructed from a starting cup to finished-drawn blank, or even necked case without any anneal. More particularly, it has been my discovery that by maintaining the percent of draw forming to a maximum of ten percent in reduction in case blank diameter, a maximum of ten percent in reduction in diameter of the extruded portion of the case and a maximum of twenty-five percent reduction of wall thickness during the ironing of the sidewalls, a gradual, and generally uniform increase of case length occurs which, when performed in a continuous series of uninterrupted draw steps, is accomplished without intermediate anneals, pickling, washing, storage, inspection or other steps. The result is, of course, a materially cheaper cartridge case. Additionally, it has been found that the final case has physical characteristics even better than those capable of accomplishment by the more expensive, more complicated manufacturing processes employed in the prior art. Accordingly, as a result of the employment of my process, not only has an improved method of cartridge case manufacture been accomplished, but a substantially improved cartridge case, whether considered immediately prior to the finishing steps of necking and case head forming, or subsequent to the completion of the entire case, is provided.

It is, accordingly, an object of the present invention to provide a novel and substantially improved method of manufacturing cartridge cases or the like.

Still another object of the invention is to provide an improved cartridge case, both in an intermediate and finished product sense.

A feature of the invention is the utilization of combined draw forming, forward extrusion, and mild ironing steps with a minimum time lapse between each operation to form a finished cartridge case blank in the intermediate product form without utilization of annealing steps.

A further feature of the invention is the provision of a novel cartridge case blank of cartridge case brass having a substantially uniform hardness throughout the cartridge case length following the draw operations, which hardness is substantially in excess of established final product specifications whereby final hardness of the finished cartridge case may be accomplished readily by selective localized annealing.

Still other and further objects and features of the invention will at once become apparent to those skilled in the art from a consideration of the attached drawings wherein one embodiment of the invention is shown by way of illustration only, and wherein:

FIGURE 1 comprises a sequential illustration of successive steps in the manufacture of a cartridge case from a cup blank, individual stages being numbered 5 through 12 and shown in cross-section;

Figure 2:
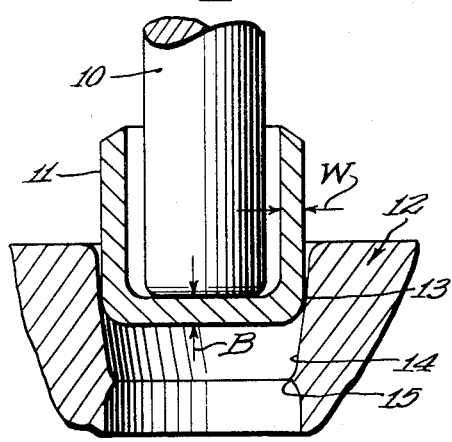
Figure 3:
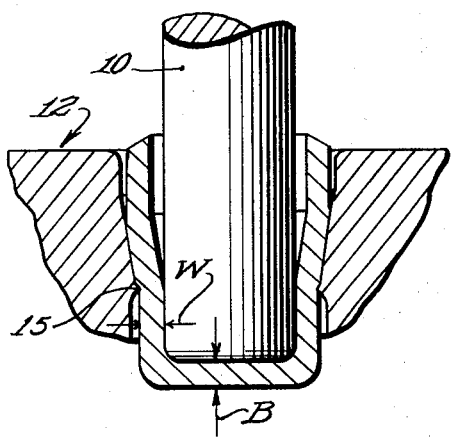
Figure 4:
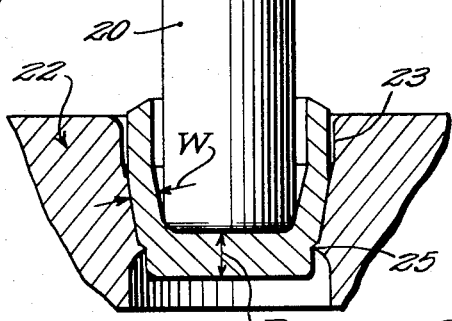
Figure 5:
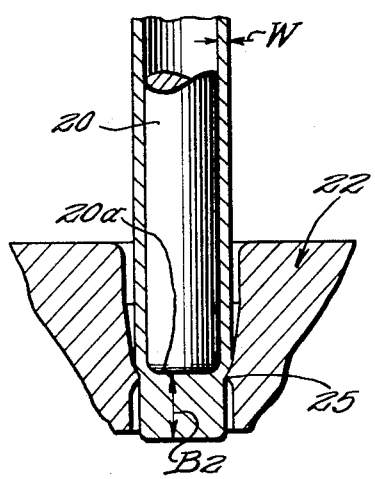
Figure 6:
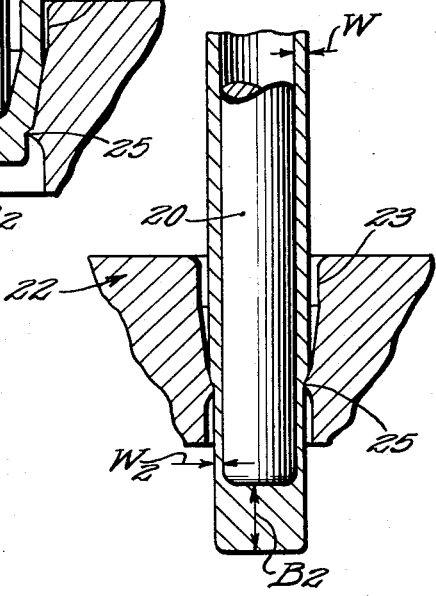

FIGURES 2 and 3 comprise side-elevational views of a draw-forming step in accordance with the present invention, without wall reduction;

FIGURE 4 illustrates in a side-elevational view the step of extrusion forming of the base of the cartridge case;

FIGURE 5 illustrates in cross-sectional, side-elevational view the operation of the punch in a transition stage between consecutive extrusion and ironing forming of a cartridge casing;

FIGURE 6 shows, in cross-sectional side-elevation the punch and die in the condition immediately following the step illustrated in FIGURE 5, in which the cartridge case wall is being ironed.

Figure 1:
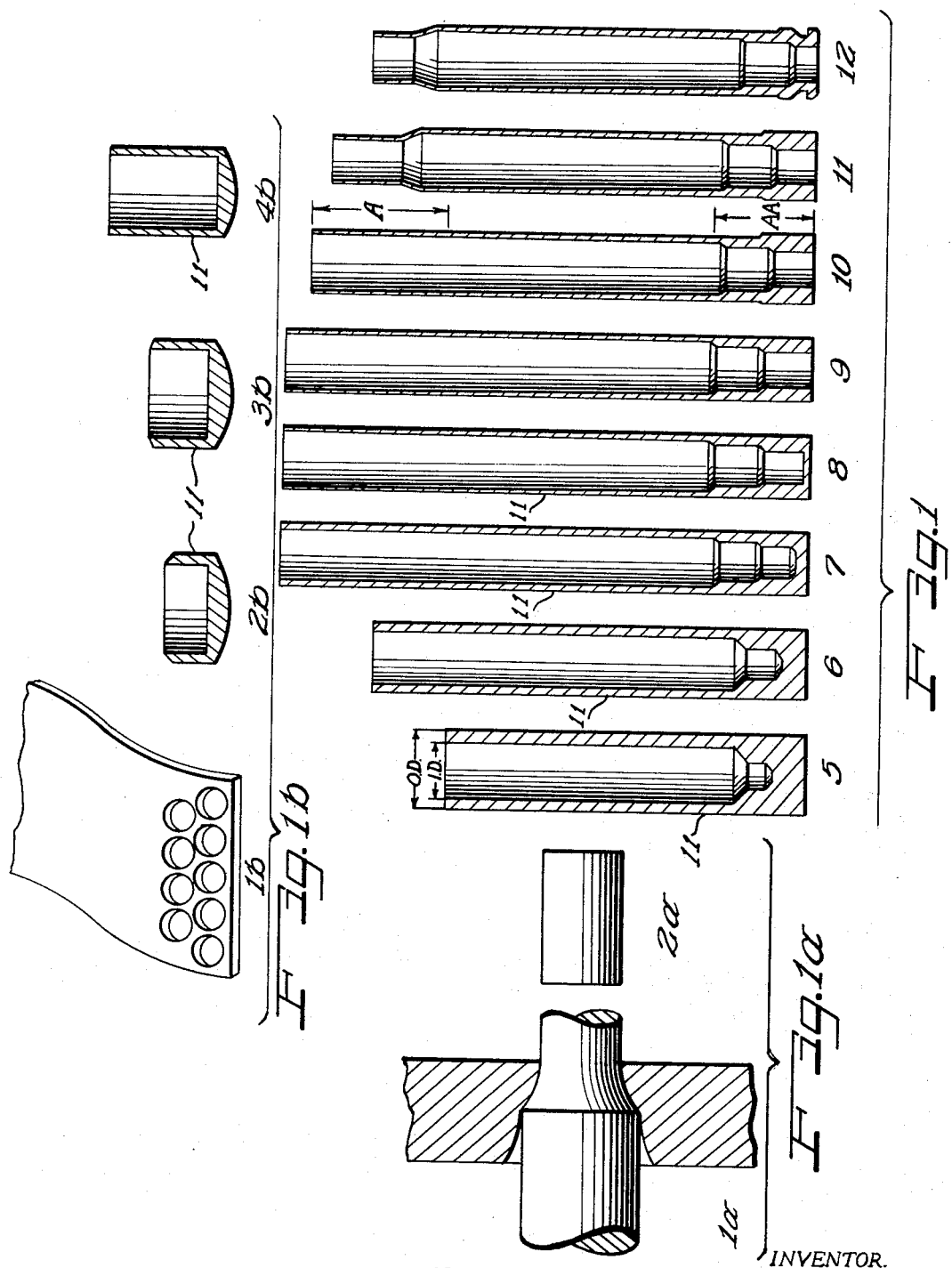
FIGURE 1a illustrates the starting material as drawn rod cut to length.
FIGURE 1b illustrates the stages of manufacture employing sheet material as the starting material.
Figure 7:
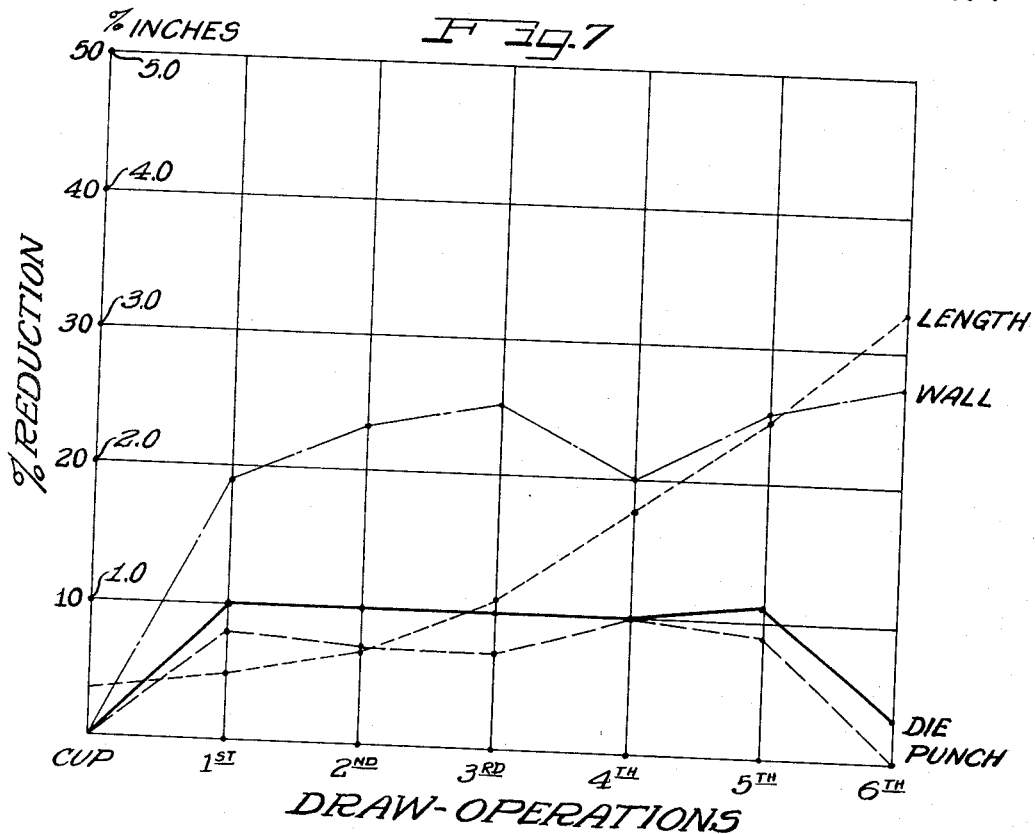
Figure 8:
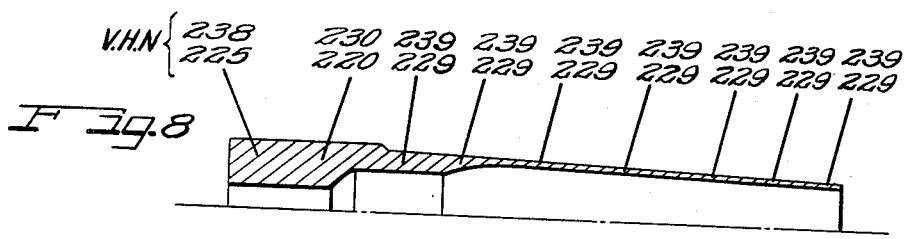
Figure 9:
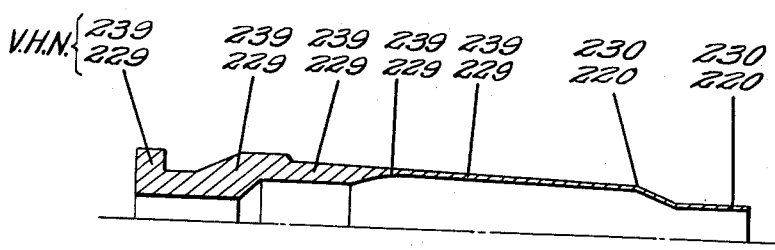

FIGURE 7 is a chart illustrating the relationship between the length of the cartridge case and the percent of wall reduction therein during the several forming operations performed in accordance with the present invention;

FIGURE 8 is a partial side-elevational view in cross-section of the cartridge case blank in its intermediate form illustrated as stage 10 in FIGURE 1 with representative hardness readings (V.H.N.) employing a one kilogram load; and FIGURE 9 is a partial side-elevational view in cross-section of a completed cartridge casing constructed in accordance with the principles of the present invention and corresponding to stage 12 of FIGURE 1, showing the hardness (V.H.N.) of the completed case at various points along its length.

As shown on the drawings:

The process of the present invention employs a plurality of metal-forming techniques. The nature of these techniques may be more clearly understood from a consideration of FIGURES 2 through 6. FIGURES 2 and 3 illustrate the technique of draw-forming. In this technique the cartridge case blank has a wall thickness W and a base thickness B. The punch 10 introduces the blank 11 into a die 12 having a starting opening 13 which is substantially the same as the outside diameter of the blank 11 as shown. The die 12 is gradually necked inwardly as at 14 to a minimum diameter 15 which is substantially equal to the diameter of the punch 10 plus twice the thickness W so that as the blank 11 is forced through the neck 15, as illustrated in FIGURE 3, it emerges with a wall thickness W and a base thickness B substantially identical to these dimensions at the beginning of the operation shown in FIGURES 2 and 3. Accordingly, the draw-forming provides a reduction in outside diameter of the blank but does not appreciably modify the thickness of the wall thereof.

A second forming technique is illustrated in FIGURE 4 where forward extruding is illustrated. As there shown, the die 22 is provided with a starting opening 23 scome- what larger in diameter than the outside diameter of the cartridge blank which has a wall thickness W and a base thickness B. The die necks to a minimum diameter 25 which equals the diameter of the punch 20 plus a figure substantially less than twice the width W so that as the punch forces the cupped blank toward the neck 25 the metal in the base B of the cup must be displaced to permit its passage through the neck 25. Since the punch 20 is larger than the punch 10, the material cannot be formed radially inwardly against the punch in the manner shown in FIGURES 2 and 3. Instead, the metal must flow forwardly in an extrusion manner which results in increasing the thickness B. In this maner, the thickness of the base B may be increased, the maximum base thickness being completed, for a given extrusion step, at the point in the stroke at which the leading end 20a of the punch 20 passes into the neck 25.

FIGURE 5 illustrates the transition zone following extrusion. As there illustrated, the end 20a of the punch 20 is approximately even with the reduced neck 25 and the maximum extrusion has resulted in an increased base thickness B. As the punch 20 progresses downwardly relative to the die 22, the wall of the blank, as indicated at W, is too thick to pass freely through the neck 25. Accordingly, as the punch 20 passes downwardly through the neck 25, as illustrated in FIGURE 6, the wall is ironed from a thickness W to a reduced thickness $W_2$.

In accordance with the present invention, the forming techniques above described are employed in a mild form in a manner providing a minimum lapse of time between operations. Thus, draw-forming is performed to provide a maximum reduction of blank diameter on the order of ten percent, extrusion is limited to provide a reduction in diameter of the extruded portion of the case head on the order of ten percent or less, and the ironing of the sidewall is limited to a maximum reduction in width W on the order of twenty-five percent or less. As will more fully be described hereafter, these forming techniques are combined to provide a smoothly and gradually increasing cartridge case blank length. This concept, and the application thereof, is charted in FIGURE 7 by way of illustration.

As shown in FIGURE 7, a cartridge case cup, considered the first step in the process charted, is given six consecutive forming operations. In these operations the die internal diameter is modified to provide a maximum percent reduction thereof on the order of ten percent or less, providing, as above discussed, a case blank outside diameter (cup O.D.) reduction on the order of ten percent or less. By controlling the punch diameter (cup I.D.) the wall thickness is reduced on the order of twenty-five percent or less in each consecutive step, and as a result, the length of the case is provided, as charted, with a gradual and progressive increase to its final desired length. In these operations, the forward extrusion of the head is accomplished with a similar outside head diameter reduction on the order of ten percent determined by the die reduction (cup O.D.).

In practice the forming, extrusion and ironing techniques may and are preferably combined in each forming stage, the net result in each pass or forming stage being in conformity with each of the maximum limits noted. By the application of the controlled reductions above described, and by providing a rapid transfer of the cartridge case blank from forming stage to forming stage, the heat resulting from the forming occurring in each stage is retained in the part as it proceeds through the process. This retention of heat in turn prevents the buildup of deleterious stresses and work-hardening within the case as it is being shaped. Accordingly, as has been noted, intermediate annealing with its attendant additional process operations, is eliminated.

The process of the present invention preferably starts with a cupped blank which can readily be formed from drawn wire. For the case specifically discussed below, particularly good physical characteristics were obtained employing a wire of .343" O.D. after cold-drawing in one minimal outside diameter reduction pass to provide a material approximately one-quarter hard and almost fully annealed. Alternatively, cartridge brass sheet may be used as shown in FIGURE 1b and cupped in several stages. FIGURES 1a and 1b illustrate alternative initial processing in that the initial stage 5 of FIGURE 1 may be achieved as a result of one forming process step from an input blank comprising the output of either FIGURE 1a or FIGURE 1b. Since the initial processing shown in FIGURE 1a eliminates draw stages and since it provides a superior final case, I prefer to combine FIGURES 1a and 1 in practicing the invention.

As an example of my process, a very satisfactory cartridge casing has been constructed by providing a series of six forming operations after an initial cupping operation. Thus, a sheet 1b was pierced and cupped as at 2b. A first forming operation provided the blank shown in 3b and a second forming operation provided the blank of 4b. Third, fourth, fifth, and sixth forming operations provided blanks designated stages 5, 6, 7 and 8, respectively, in FIGURE 1. These stages correspond with the draw operations charted in FIGURE 7. Following the sixth draw, the cartridge case blank is pierced through its base to the form shown at stage 9, is cut to length to the form shown at stage 10 and moderately headed. Following stage 10 the neck of the casing blank is locally stress-relieved by heating the blank at a temperature on the order of 500° F. to 600° F. through the lengths indicated at A and AA in stage 10 and the cartridge case is necked to the stage 11 form and machined in the head and neck areas to the final form shown in stage 12. In considering the process, the machining and heading stages 11 and 12 are essentially conventional. However, the treatment of the cartridge case blank throughout the forming operations and localized stress relief is completely novel and comprises an important aspect of my invention.

As an illustration of dimensions graphically illustrated in FIGURE 7, the following table illustrates the cartridge casing starting from a cup [stage 2b, FIGURE 1b through stage 8 of FIGURE 1].

CARTRIDGE CASE BLANK—DRAW DATA

| Draw and station | Cup, O.D., in. | Percent reduction | Cup, I.D., in. | Percent reduction | Wall, in. | Percent reduction | Length, in. |
| --- | --- | --- | --- | --- | --- | --- | --- |
| Cup (2b) | .522 | 0 | .419 | 0 | .052 | 0 | .345 |
| 1st (3b) | .470 | 10 | .384 | 8 | .043 | 19 | .470 |
| 2nd (4b) | .423 | 10 | .357 | 7 | .033 | 23 | .684 |
| 3rd (5) | .380 | 10 | .330 | 7 | .025 | 25 | 1.082 |
| 4th (6) | .341 | 10 | .301 | 10 | .020 | 20 | 1.750 |
| 5th (7) | .304 | 11 | .274 | 9 | .015 | 25 | 2.420 |
| 6th (8) | .296 | 3 | .274 | 0 | .011 | 27 | 3.275 |

It is, of course, within the intent of my invention that the number of forming steps may be increased or decreased as necessary to retain the amount of metal-working within the limits above prescribed.

As a result of the metal-working accompanying each stage of the forming, as above described, substantial heat is developed within the cartridge case blank. By performing the successive stages or forming operations sequentially in a single multi-stage press, with a rapid conveyance of the individual cartridge stage blank from stage to stage, the heat is retained in the blank between stages and prevents the build-up of stresses and the objectionable work-hardening that ordinarily occurs in prior methods. Accordingly, I have been able to manufacture cartridge cases without any annealing processing between forming steps. Although I have been successful in this, it is sometimes convenient to provide a single annealing step prior to the introduction of the basic starting point blank into the sequential press. In other words, for example, it may be desirable to anneal the cup 2b after its emergence from the strip sheet, if it is to be employed as the initial starting product in a press line and may be stored over a period of time prior to that usage. Similarly, in the case of the employment of wire, I have found it very satisfactory to cut the wire into the slug form 2a and initially extrude it by impact extrusion into the form illustrated at page 5 which is then introduced into a sequential press for successive forming operations 6, 7 and 8. In this latter case, the case blank may be stored, and hence cooled down, in which case an annealing operation, for example, at 1100° F. for eight minutes was found satisfactory.

The reduction, or substantial elimination of annealing steps between successive metal working stages of the process is of extreme importance. To my knowledge, no prior art process of manufacturing brass cartridge cases has ever contemplated successfully the elimination of annealing steps. For example, in the prior drawing or forming stages in the manufacture of a cartridge case, anneals would ordinarily have been provided between stages 2b and 3b, stages 3b and 4b, stages 4b and 5, stages 5 and 6, stages 7 and 8, and stages 9 and 10. Each of these conventional annealing steps would require, in addition, an inspection prior to the anneal, a cleaning following the anneal, a pickling following the anneal, a subsequent cleaning and drying, and a lubrication preceding the subsequent forming operation. Each of these additional steps requires, of course, time as well as material, and the elimination of annealing steps very substantially reduces the cost of the final product. In the case of the present invention, however, these additional costs have been eliminated while at the same time an improved cartridge case blank emerges from the final drawing or forming operation.

The cartridge case blank after its final forming stage 8, and piercing, illustrated in FIGURE 9, has a superior hardness. This may be seen from a consideration of FIGURE 8 wherein the cartridge case blank, essentially as shown at stage 9, is illustrated in cross-section with Vickers hardness data applied. In experimental testing, these readings were determined on a Tukon microhardness tester using a one kilogram load. The higher of the two adjacent readings directed to individual points on the case comprises the highest of a series of readings achieved while the lower of the two figures is the minimum reading.

It will be apparent, from a consideration of FIGURE 8, for example, that all of the readings are substantially in excess of 200 V.H.N. and are, in fact, on the order of 220 V.H.N. or higher. These hardnesses are substantially higher than military or other specifications require and, additionally, are substantially higher than heretofore considered possible in a uniform, consistent sense. The hardness of the case throughout its length is sufficiently high to permit subsequent localized annealing operations designed to provide an optimum hardness or softness in individual areas of the case. This is illustrated in FIGURE 9, as well as in FIGURE 1, stages 10, 11 and 12.

In the finishing stages of the manufacture of a cartridge casing, it is necessary to neck the cartridge at its upper end for receiving the projectile. A local partial anneal is ordinarily performed, accordingly, at the mouth of the cartridge case (through length A in stage 10 of FIGURE 1) to permit the substantial necking operation to be performed without excessive stresses, and to permit the subsequent swaging of the case to the projectile. Similarly, in some cases a local partial anneal AA may be desired at the head end of the cartridge case to provide slight softening at the belt. As pointed out, these and lower hardnesses may readily be achieved by local low temperature heating in the range of 500° F. to 600° F. and, accordingly, the high hardnesses throughout the remainder of the case are readily accomplished without adversely affecting the portions of the case required to be soft. As those skilled in the art of cartridge manufacture are well aware, it is much more difficult to locally harden the cartridge case, if practical at all, it has been softened, than it is to reduce localized areas of a substantially hard case to lower levels of hardness as in the present invention.

As above discussed, generally, the method of the present invention provides an extremely low-cost cartridge case. A single conventional multiple station transfer press is capable of producing a completely formed case ready for heading and necking from a first stage formed cup. This eliminates all intermediate anneals with intermediate inspections and other miscellaneous related operations attendant with annealing. A single final inspection is necessary prior to heading and necking and it has been found from experience that the cases manufactured in accordance with the present invention are very substantially superior in performance and in absence of rejects. The process of this invention provides substantially perfect cartridge cases from cartridge brass (70% Cu, 30% Zn) with a resultant minimum of scrap, and, of course, no intermediate storage facility requirements whatever.

While the case blank illustrated may leave the press at stage 8 as above noted and described, the process of the present invention permits necking without anneal if the case is necked while still hot immediately following the sixth draw. I find that if the case is not permitted to cool it can be necked without anneal. If so processed, the case blank is trimmed in the sequential press, necked and then pierced at the head end. When thus made, the hardness ratings of the case are uniformly high throughout the necked case, in the general range shown in FIGURE 9.

I claim as my invention:

1. The method of manufacturing a cartridge case, comprising the steps of providing a cupped blank of brass, forcing said cup on a succession of punches through a succession of die stages of successively reduced opening diameters smaller than the outside diameter of the cup entering the respective die opening to reduce the outside diameter of the cup, thicken the closed end thereof and thin the longitudinal walls thereof, each successive forming operation being limited to ten percent or less reduction in outside diameter of the blank and twenty-five percent or less reduction in longitudinal wall thickness.

2. The method of claim 1 wherein the cup is transferred between substantially all successive forming die stages without annealing.

3. The method of claim 1 wherein the heat developed in the cup by forming in each die stage is substantially retained in the cup whereby successive forming steps are performed at temperatures substantially above ambient temperature.

4. The method of claim 2 wherein the heat developed in the cup by forming in each die stage is substantially retained in the cup whereby successive forming steps are performed at temperatures substantially above ambient temperature.

5. The method of claim 4 wherein the closed end and the open end of the cup are locally partially annealed following the final die stage by the application of heat locally to said ends without the application of substantial heat therebetween to lower the hardness of such ends.

6. The method of claim 5 wherein the locally heated and stress-relieved cup is necked and machined at its respective open and closed ends to produce a finished cartridge case.

7. The method of claim 4 wherein the blank is necked and machined at its respective open and closed ends without cooling or annealing following the last forming step.

8. The method in accordance with claim 1 wherein said initially provided cupped blank comprises a cup formed of wire or bar stock and the punch of each succeeding stage is introduced longitudinally to the axis of said wire or bar.

9. The method of claim 1 wherein said initially provided cupped blank comprises a cup formed of a circle of brass cut from brass sheet the grain of which runs transversely of such circle.

References Cited

UNITED STATES PATENTS 2,350,491  6/1944  Butler _____ 29—1.3

OTHER REFERENCES

Publication—American Machinist, p. 115, July 22, 1943.

RICHARD F. EANES, JR., *Primary Examiner.*